(12) United States Patent
Hwang

(10) Patent No.: US 11,017,698 B2
(45) Date of Patent: May 25, 2021

(54) HEALTH MONITORING DEVICE AND LARGE AREA DISPLAY INCLUDING THE SAME

(71) Applicant: COTS Technology Co., Ltd., Seongnam-si (KR)

(72) Inventor: Byeung Chang Hwang, Seongnam-si (KR)

( * ) Notice: Subject to any disclaimer, the term of this patent is extended or adjusted under 35 U.S.C. 154(b) by 458 days.

(21) Appl. No.: 16/047,010

(22) Filed: Jul. 27, 2018

(65) Prior Publication Data
US 2019/0378446 A1    Dec. 12, 2019

(30) Foreign Application Priority Data

Jun. 7, 2018    (KR) .......................... 10-2018-0065455

(51) Int. Cl.
*G09G 3/00*  (2006.01)
*G06F 3/14*  (2006.01)
*G09G 3/20*  (2006.01)

(52) U.S. Cl.
CPC ........... *G09G 3/006* (2013.01); *G06F 3/1446* (2013.01); *G09G 3/2096* (2013.01); *G09G 2300/026* (2013.01); *G09G 2330/02* (2013.01)

(58) Field of Classification Search
CPC ............ G06F 3/1446; G09G 2300/026; G09G 2320/041; G09G 2330/02; G09G 2354/00; G09G 3/006; G09G 3/2096
See application file for complete search history.

(56) References Cited

U.S. PATENT DOCUMENTS

| 2009/0006659 | A1* | 1/2009 | Collins | .................. H04L 63/10 710/8 |
| 2015/0338911 | A1* | 11/2015 | Yamamoto | ............ G06F 3/1446 713/323 |
| 2018/0136894 | A1* | 5/2018 | Lee | ........................... G06F 1/30 |
| 2018/0226051 | A1* | 8/2018 | Swaminathan | ........ G09G 5/395 |
| 2019/0213091 | A1* | 7/2019 | Chou | .................. G06F 11/3058 |
| 2020/0294401 | A1* | 9/2020 | Kerecsen | ............. G05D 1/0287 |

FOREIGN PATENT DOCUMENTS

KR    10-1007969    1/2011

* cited by examiner

*Primary Examiner* — Chun-Nan Lin
(74) *Attorney, Agent, or Firm* — Antonio Ha & U.S. Patent, LLC

(57) ABSTRACT

A health monitoring device included in a large area display (LAD) with at least one display computers comprises a universal asynchronous receiver-transmitter (UART) configured to produce a test path by communicating with a processor of the display computer, a field programmable gate array (FPGA) configured to transmit a test signal to a terminal of the display computer and receive a test result, an ethernet unit configured to communicate with a test terminal connected with the LAD to transmit a monitoring signal to the test terminal, and a micro-controller configured to gather an operation state of the display computer and produce a measurement signal according to the test result.

3 Claims, 5 Drawing Sheets

HEALTH MONITORING DEVICE AND LARGE AREA DISPLAY INCLUDING THE SAME

CROSS-REFERENCE TO RELATED APPLICATIONS

This patent application claims priority under 35 U.S.C. § 119 to Korean Patent Application No. 10-2018-0065455, filed on Jun. 7, 2018, in the Korean Intellectual Property Office, the disclosure of which is incorporated by reference herein in its entirety.

TECHNICAL FIELD

Embodiments of the disclosure relate to health monitoring devices, and more specifically, to a large area display (LAD) equipped with a dual-display computer and a real-time health monitoring device for the LAD.

DISCUSSION OF RELATED ART

Display equipment come with various components, such as sensors, monitors, processors, storage, and a number of cables, and the components communicate image or video signals via point-to-point connections as per a diversity of standards, e.g., ARINC-818, DVI, CVBS, and VGA. This requires the use of many transmission lines or cables and may add inconvenience or complexity.

Meanwhile, the advent of large area display (LAD), capable of high-definition image display, requires high-volume transmission solutions. Conventional LAD equipment suffer from unstable operation and lack of quick response to any problems or issues that may arise while in operation.

SUMMARY

According to an embodiment of the present invention, a health monitoring device included in a large area display (LAD) with at least one display computers comprises a universal asynchronous receiver-transmitter (CART) configured to produce a test path by communicating with a processor of the display computer, a field programmable gate array (FPGA) configured to transmit a test signal to a terminal of the display computer and receive a test result, an ethernet unit configured to communicate with a test terminal connected with the LAD to transmit a monitoring signal to the test terminal, and a micro-controller configured to gather an operation state of the display computer and produce a measurement signal according to the test result.

The health monitoring device may further comprise a first analog-to-digital converter (ADC) configured to convert an input voltage and current applied to the processor into a first digital signal and a second ADC configured to convert the test signal applied through the terminal to the processor into a second digital signal. The micro-controller may be configured to receive the first digital signal and the second digital signal and reflect the first digital signal and the second digital signal to the measurement signal.

The second ADC may be configured to convert a temperature signal applied from a temperature sensor included in the display computer into a third digital signal. The micro-controller may be configured to receive the third digital signal and reflect the third digital signal to the measurement signal.

According to an embodiment of the present invention, an LAD comprises a display head assembly including a plurality of display modules, a housing assembly including a plurality of display computers, each of the display computers connected with a respective one of the plurality of display modules and configured to provide an image signal, and a rear interface assembly including a switch module having a plurality of ports, the switch module connected with an external system and configured to provide power and operation data to the plurality of display computers. Each of the plurality of display computers may include a health monitoring device configured to gather an operation state of the display computer and provide a measurement signal.

Each of the plurality of display computers may include a video processing module configured to decode video data received from an outside to produce the image signal, a graphic processing module configured to add a graphical effect to the image signal, a core processing module configured to control the video processing module and the graphic processing module, and a power supply module configured to supply the power.

The health monitoring device may include a UART configured to produce a test path by communicating with a processor equipped in the video processing module, the graphic processing module, or the core processing module, an FPGA configured to transmit a test signal to a terminal of the display computer and receive a test result, an ethernet unit configured to communicate with a test terminal connected with the LAD to transmit a monitoring signal to the test terminal, a first ADC configured to convert an input voltage and current applied to the processor into a first digital signal, a second ADC configured to convert the test signal applied through the terminal to the processor into a second digital signal, and a micro-controller configured to gather the test result, the first digital signal, and the second digital signal and produce the measurement signal.

The plurality of ports of the switch module include three high-speed ports configured to communicate with the plurality of display computer in an ethernet scheme and a plurality of low-speed ports. One of the three high-speed ports may be connected to a connector connected to the external system, and two of the three high-speed ports may be connected with the core processing module.

The plurality of display computers include a first display computer and a second display computer. Respective processors of the first display computer and the second display computer may be synced with each other via a fast ethernet connection.

The plurality of display modules include a first display module and a second display module. The first display computer and the second display computer may be connected with the first display module and the second display module, respectively, via serial connections.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

When an element "includes" another element, the element may further include the other element, rather excluding the other element, unless particularly stated otherwise.

Although some exemplary embodiments of the disclosure are described herein, the technical spirit or scope of the disclosure are not limited thereto. Prior to going into the detailed description of the disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "controller" may mean any device, system, or part thereof controlling at least one operation. As used herein, the term "device" may be implemented in hardware, firmware, software, or some combinations of at least two thereof.

As used herein, the term "unit," "module," or "device" may refer to a unit configured to process at least one function or operation, and such unit, module, or device may be implemented in hardware, software, or a combination thereof.

Various schemes or methods described herein may be implemented in hardware, software, or a combination thereof. As used herein, the term "unit," "module," or "device" may also be equivalent to a computer-related entity, a hardware component, a software component, or a combination thereof.

As used herein, the singular forms "a," "an," and "the" are intended to include the plural forms as well, unless the context clearly indicates otherwise. Hereinafter, exemplary embodiments of the disclosure will be described in detail with reference to the accompanying drawings. The disclosure, however, may be modified in various different ways, and should not be construed as limited to the embodiments set forth herein.

Figure 1:
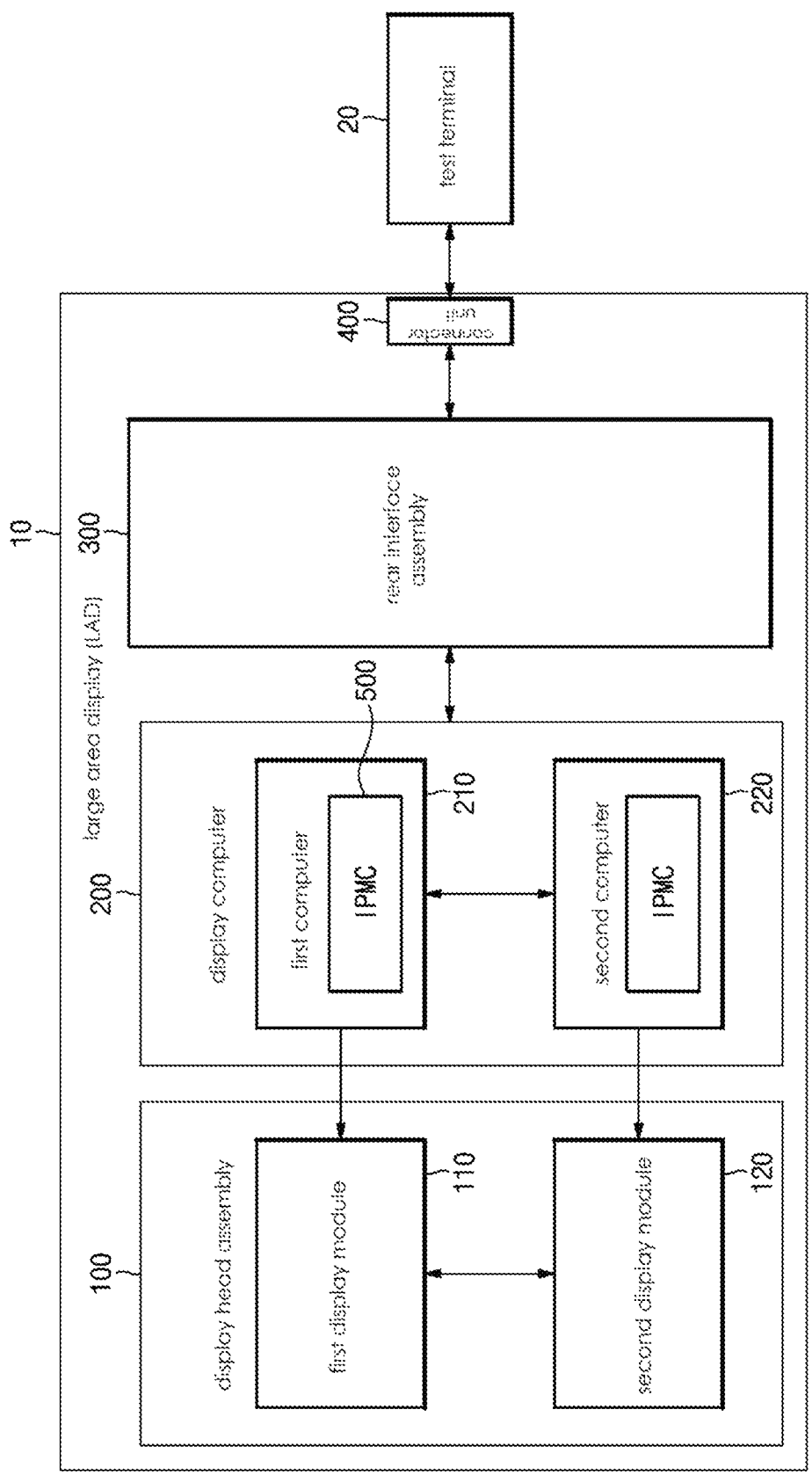
FIG. 1 is a block diagram illustrating a configuration of a large area display (LAD) including a health monitoring device according to an embodiment of the present invention.

FIG. 1 is a block diagram illustrating a configuration of a large area display (LAD) including a health monitoring device according to an embodiment of the present invention. Although the drawings illustrate an example in which the large area display (LAD) has two display modules, embodiments of the disclosure are not limited thereto, and for example, the LAD may have more or less display modules.

Referring to FIG. 1, according to an embodiment of the present invention, an LAD 10 may include a display head assembly 100 for displaying screen, a housing assembly including a display computer 200 for controlling the operation of the display head assembly 100, a rear interface assembly 300 for providing a communication path between an external system and a test terminal 20 and supplying power, and a connector unit 400 connected to the rear interface assembly 300, the test terminal 20, and the external system.

The display head assembly 100 may be an assembly of a first display module 110 and a second display module 120 to display images. The display head assembly 100 may form a front surface of the LAD 10. The display head assembly 100 may have a structure in which the two display modules, which may be large-screen display modules, are coupled together side-by-side and fastened by a predetermined mechanical structure.

The first display module 110 and the second display module 120 may simultaneously display the same image or may display different images. The first display module 110 and the second display module 120 may be controlled by a first computer and a second computer, respectively, that are different from each other.

The first and second display modules 110 and 120 may be large-area (or large-screen) liquid crystal displays (LCDs), organic light emitting displays (OLEDs), or other flat panel displays (FPDs).

The display computer 200 may decode image data provided from the external system, provide the decoded image data (or image signals) to the display head assembly 100, and control the display head assembly 100 to display intended images. The display computer 200 may be mechanically or electrically connected with the display head assembly 100 and the rear interface assembly 300 in a predetermined housing assembly (not shown), forming the LAD 10.

The display computer 200 may include a first computer 210 and a second computer 220, respectively, corresponding to the first display module 110 and the second display module 120. The first computer 210 and the second computer 220 may interwork with each other to provide one screen or two or more split screens.

According to an embodiment of the present invention, each of the first computer 210 and the second computer 220 may be equipped with a health monitoring device 500. The health monitoring device may be an intelligent platform management controller (IPMC). According to an embodiment of the present invention, a plurality of health monitoring devices 500 may be equipped in each of the first computer 210 and the second computer 220. The health monitoring devices 500 may be provided in modules.

The health monitoring device 500 may gather a driving voltage or current input to each of the first computer 210 and the second computer 220 and the temperature of each of the first computer 210 and the second computer 220, transmit or receive test signals, and measure, in real-time, the current operating state of the first computer 210 and the second computer 220. Signals measured or obtained by the health monitoring devices 500 may be transmitted to the test terminal 20 via, e.g., a gigabit network.

The rear interface assembly 300 may interconnect the other components of the LAD 10 through 10 gigabit ethernet or 10/100 fast ethernet, receive power and image data from the outside, and apply or transmit the image data to the other components.

The rear interface assembly 300 may form a rear appearance of the LAD 10. The connector unit 400 for connection to the external system and a plurality of fans (not shown) for radiating heat may be installed on the rear surface of the rear interface assembly 300.

The connector unit 400 may include a plurality of connectors. Any one of the connectors of the connector unit 400 installed on the rear interface assembly 300 may connect the health monitoring devices with the test terminal 20.

The test terminal 20 may be a checking device, e.g., a laptop computer. The test terminal 20 may be connected to the LAD 10, specifically the health monitoring devices 500, via the connector unit 400 to receive, in real-time, information measured or obtained by the health monitoring devices 500 and display the information on the screen.

The real-time received measurement information may have a minimum and maximum value for a normal state set and may be used to determine whether each module normally operates, and the measurement information may be visualized and displayed in graphics or text.

As such, the health monitoring devices 500 may be embedded in the display computer 200 of the LAD 10 to, in real-time, gather and provide information about the operation state of each module, allowing the system manager to check and manage, in real-time, the state of the system.

Now described in detail are the internal configuration and connections in the LAD including health monitoring devices according to an embodiment of the present invention.

Figure 2:
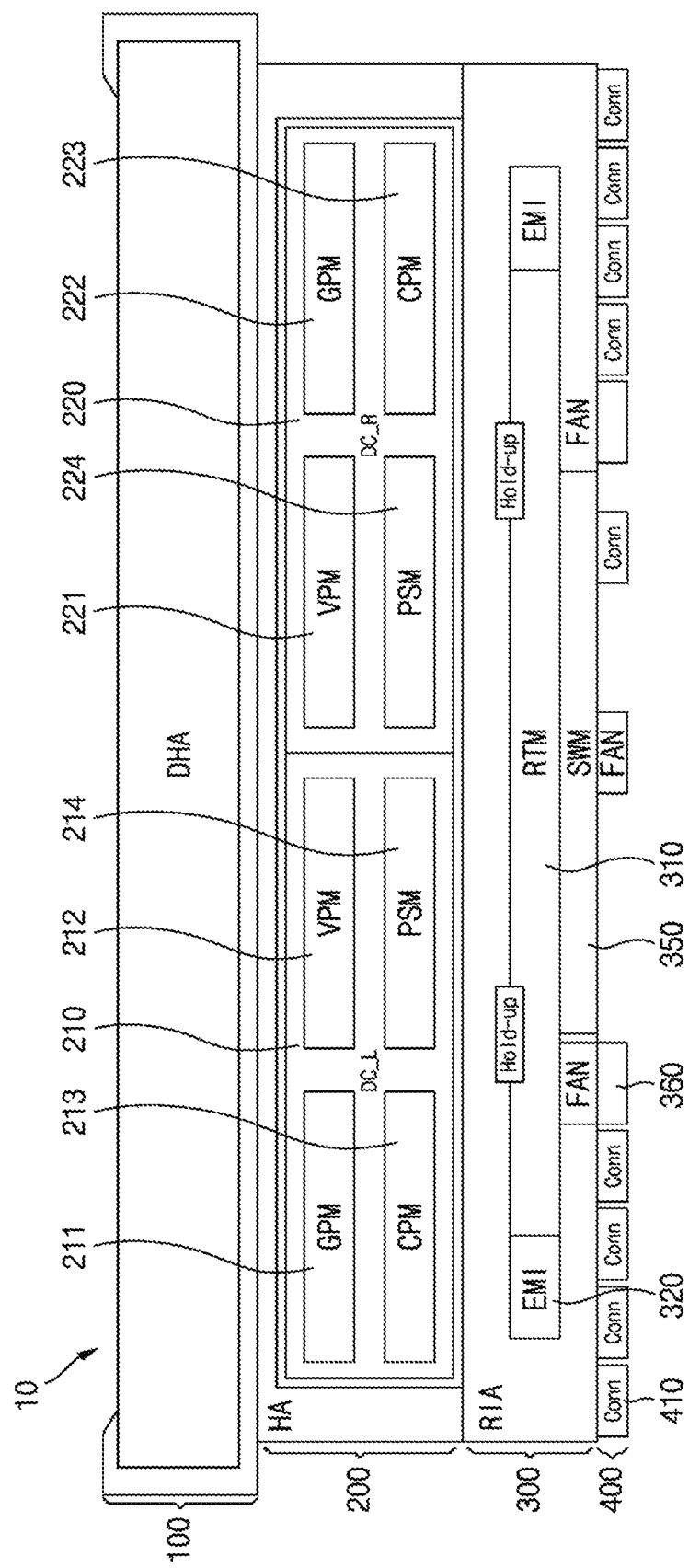
FIG. 2 is a block diagram illustrating components of an LAD including a health monitoring device according to an embodiment of the present invention.
Figure 3:
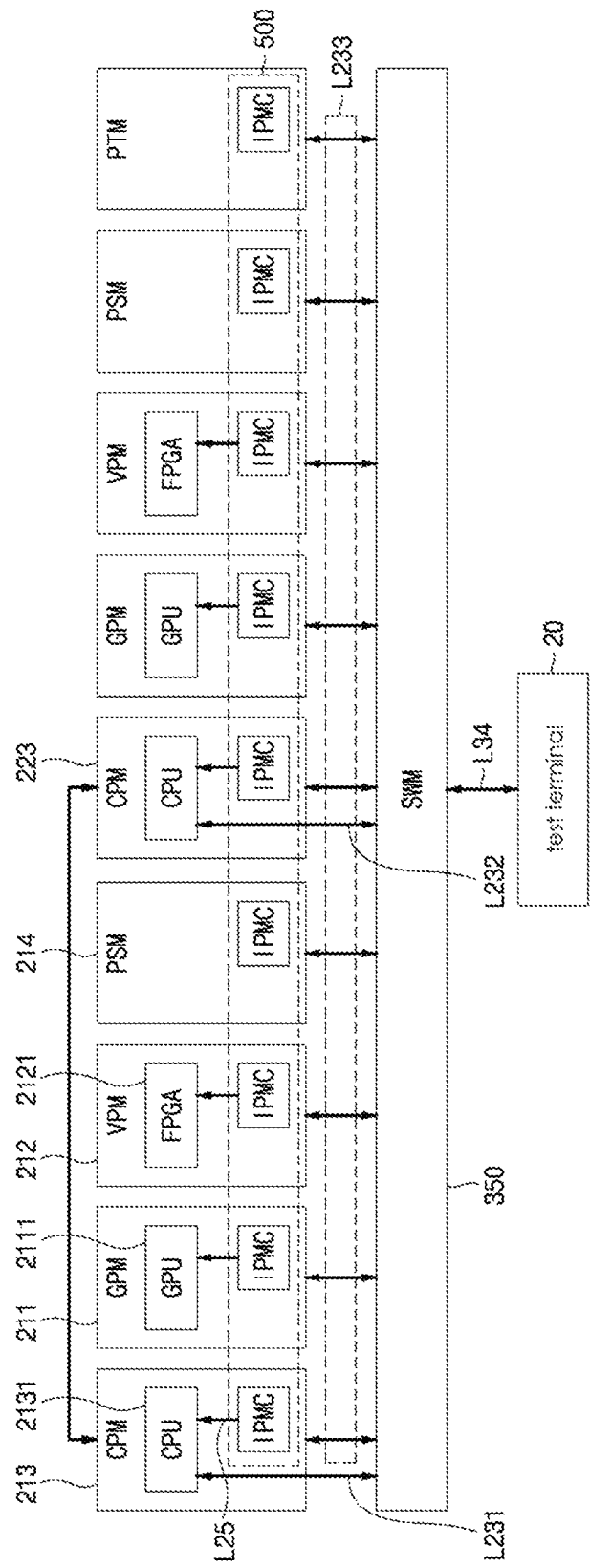
FIG. 3 is a view illustrating a configuration for communication among components of an LAD according to an embodiment of the present invention.

FIG. 2 is a block diagram illustrating components of an LAD including a health monitoring device according to an embodiment of the present invention. FIG. 3 is a view illustrating a configuration for communication among components of an LAD according to an embodiment of the present invention.

Referring to FIGS. 2 and 3, according to an embodiment of the present invention, the LAD 10 including a health monitoring device may include a display head assembly 100 including a plurality of display modules, a housing assembly 200 including a plurality of display computers 210 and 220 each of which is connected to a respective one of the plurality of display modules to provide image signals, a rear interface assembly 300 including a switch module 350 having a plurality of ports and connected with an external system to provide power and driving data to the plurality of display computers 210 and 220, and a connector unit 400. The connector unit 400 may include a plurality of connectors.

The display head assembly 100 (DHA) 100 may be disposed in the front surface of the LAD 10 and be connected to core processing modules (CPMs) of the display computers to control input/output images or videos and to overlay graphic symbols generated by the graphics processing modules (GPMs) with various formats of video images input from the outside and freely position, rotate, and scale up or down them on the screen through the video processing modules (VPMs) which outputs decoded image signals on the screen.

The display head assembly 100, except for its screen portions, may be covered by a predetermined mechanical structure, and the two display modules of the display head assembly 100 may be connected with the first and second display computers 210 and 220, positioned therebehind, via RS-422 serial cables (L121 and L122).

The housing assembly (HA) 200 may connect the display head assembly 100 with the rear interface assembly 300. The HA 200 may include a space to mount the first and second display computers 210 and 220.

The first display computer 210, e.g., the left-hand display computer (DC_L), may include a plurality of modules to control the left-hand display module. The plurality of modules of the DC_L 210 may include, e.g., a graphic processing module (GPM) 211 to process graphical effects on images displayed on the screen, a video processing module (VPM) 212 to decode image data to produce image signals, a core processing module (CPM) 213 to control the operation of the display module, and a power supply module (PSM) 214 to supply driving power.

The second display computer 220, e.g., the right-hand display computer (DC_R), may include a plurality of modules to control the right-hand display module and may include, e.g., a GPM 221, a VPM 222, a CPM 223, and a PSM 224.

The first and second display computers 210 and 220 may be connected between the CPMs 213 and 223 via gigabit ethernet and discrete heartbeat to share data and sync with each other and to monitor the health state so that, although one of the computers 210 and 220 breaks, the other computer remains on duty.

The rear interface assembly 300 (RIA) 300 may be coupled to the rear surface of the housing assembly 200, supply power to the LAD 10, and transmit or receive signals to/from the external system.

The rear interface assembly 300 may include a rear transition module (RTM) 310 to route signals between each component and the external system and the switch module (SWM) 350 to connect the components with the connector unit 400 via ethernet.

One or more fans 360 may be installed on the rear surface of the rear interface assembly 300.

The rear transition module 310 may include one or more electromagnetic interference (EMI) filters 320.

The switch module 350 may connect the modules of the first and second display computers 210 and 220 with each other via ethernet and may be connected to the external system via the connector unit 400.

The switch module 350 may be a gigabit device with 12 ports. The switch module 350 may be connected to the CPMs 213 and 223 via gigabit ethernet networks L231 and L232, respectively, which are signal transmission paths for health management, and the switch module 350 may be connected to health monitoring devices (e.g., IPMCs), which are included in the GPMs 211 and 221, the VPMs 212 and 222, and the PSMs 214 and 224, via a 10/100 fast megabit ethernet network L233.

The switch module 350 may be connected with the connector unit 400 via a gigabit ethernet network L34.

The connector unit 400 may include a plurality of connectors (Conn) 410. The connector unit 400 may be mounted on the rear surface of the rear interface assembly 300, and the terminals of the connectors 410 may be exposed to the outside. Among the connectors 410, the one 410 connected to the test terminal may be connected with the switch module 350 via the gigabit network L34.

As set forth above, the components of the LAD 10 may be connected together via gigabit or fast (10/100 Mbps) networks. In particular, the health monitoring devices equipped in the modules of the display computers may be connected via the gigabit ethernet network to transmit measurement signals to the test terminal.

Now described in detail are the internal configuration and connections in a health monitoring device according to an embodiment of the present invention.

Figure 4:
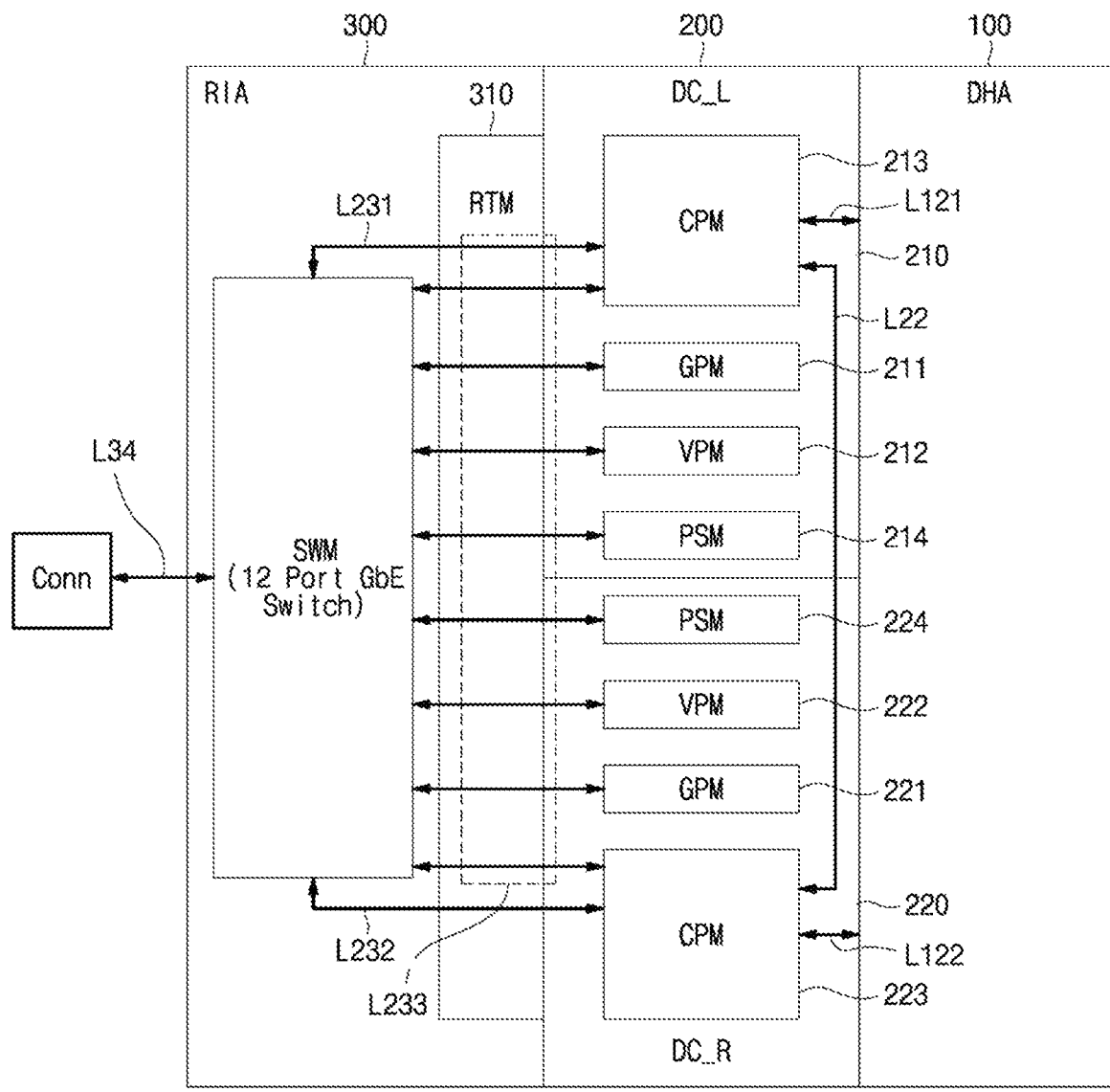
FIG. 4 is a block diagram illustrating components of a health monitoring device according to an embodiment of the present invention.
Figure 5:
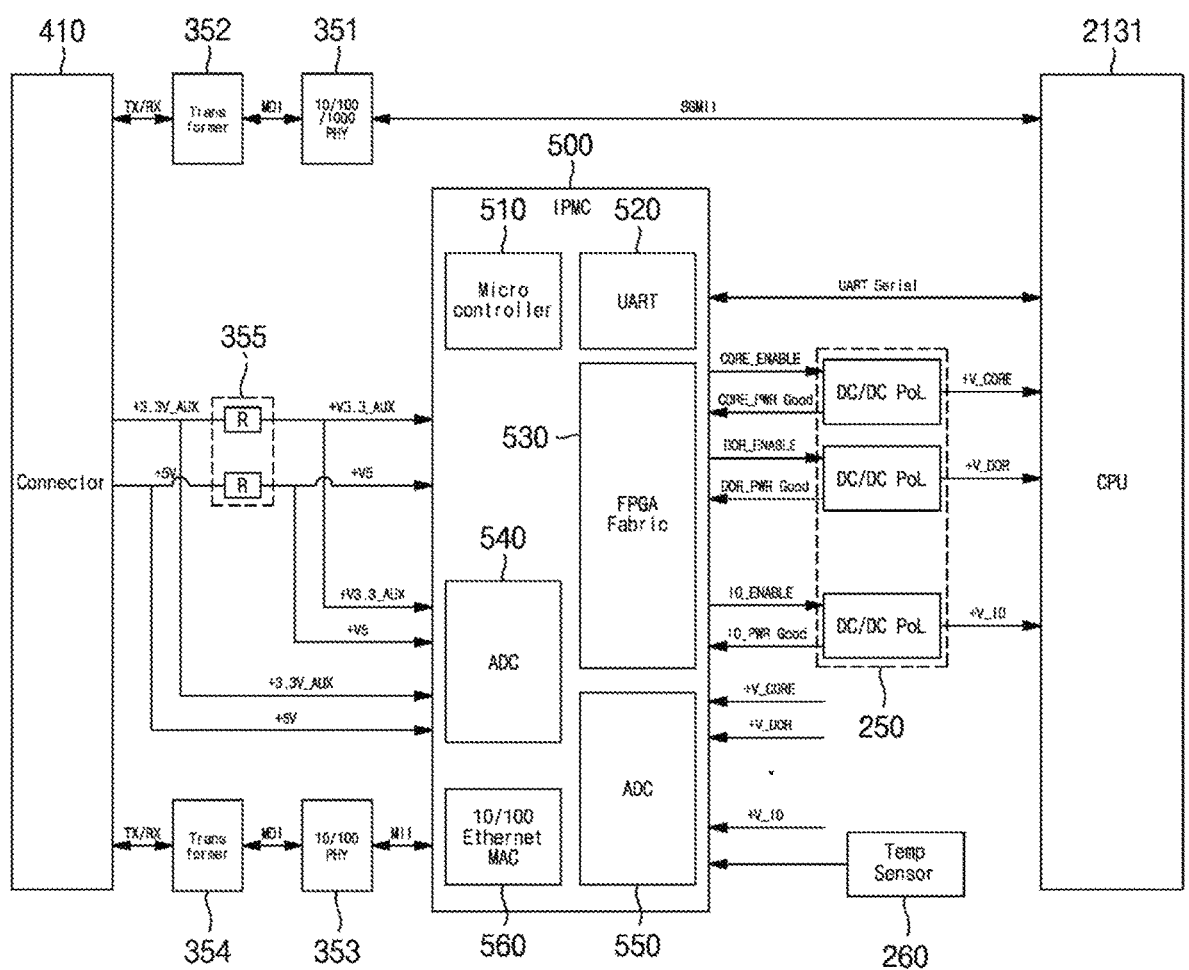
FIG. 5 is a view illustrating a configuration for communication between a peripheral device and a health monitoring device equipped in a core processing module among modules of a display computer device as shown in FIG. 4.

FIG. 4 is a block diagram illustrating components of a health monitoring device according to an embodiment of the present invention. FIG. 5 is a view illustrating a configuration for communication between a peripheral device and a health monitoring device equipped in a core processing module among modules of a display computer device as shown in FIG. 4.

Referring to FIGS. 4 and 5, according to an embodiment of the present invention, a health monitoring device (e.g., an IPMC) 500 may be equipped in each of a plurality of modules of a display computer.

The IPMC 500 may be equipped in each of the GPM 211, VPM 212, the CPM 213, and the PSM 214 of the display computer. The GPM 211, the VPM 212, the CPM 213, and the PSM 214 may be connected with respective ones of the ports of the switch module 350 via 10/100 fast ethernet L233.

The GPM 211, the VPM 212, and the CPM 213 of the display computer may include a field-programmable gate array (FPGA) 2111, a graphics processing unit (GPU) 2121, and a central processing uni (CPU) 2131, respectively, which are processors, and may be connected to the IPMCs 500 via serial connections L25.

Among the modules described above, the CPM 213 may require communication for syncing with the modules of the other display computer, and thus, the two CPMs 213 and 223 may be connected with each other via a gigabit ethernet network L22, and the CPUs 2131 of the CPMs 213 and 223 may be connected with the switch module 350 via gigabit ethernet networks L231 and L232, respectively.

As the modules of the display computers are connected with the switch module 35, measurement signals may be transmitted to the test terminal 20 via a gigabit ethernet network L34.

Now described in detail are connections between the CPU 2131 of the CPM 231 and the IPMC 500. The IPMC 500 may be a health monitoring device equipped in one of one or more display computers in an LAD. The IPMC 500 may include a universal asynchronous receiver-transmitter (UART) 520 to produce a test path by communicating with the processor equipped in each module, e.g., the VPM 212, the GPM 211, the CPM 213, or the PSM 214, of the display computer, an FPGA 530 to transmit a test signal to a terminal of the display computer and receive a test result, an ethernet unit 560 to communicate with an external test terminal 20 connected and transmit a monitoring signal to the test terminal 20, a first analog-to-digital converter (ADC) 540 to convert an input voltage or current input to the processor into a first digital signal, a second ADC 550 to convert the test signal applied via the terminal to the processor into a second digital signal, and a micro-controller to gather the test result, the first digital signal, and the second digital signal and produce a measurement signal.

The micro-controller 510 may control each component of the IPMC 500 to measure the voltage, current, and temperature input to the module, receive the test result and generate the measurement signal, and provide the measurement signal to the test terminal 20.

The CPU 2131 may be connected to the switch module via the gigabit ethernet network L231 that may use 10/100/1000 M ethernet PHY 351 and a transformer 352. The 10/100/1000 M ethernet PHY 351 and the transformer 352 may be connected with each other via a medium dependent interface (MDI). The CPU 2131 may be connected with the ethernet PHY 351 via a serial gigabit media independent interface (SGMII).

The CPU 2131 may be connected to the UART 520 of the IPMC 500, and thus, the local processor, i.e., the CPU 2131, may provide a build-in-test (BIT) path.

A DC/DC pol 250 connected with an input terminal of the CPU 2131 may receive test signals, e.g., 'CORE_EN-ABLE,' 'DDR_ENABLE,' and 'I/O_ENABLE,' as per a procedure programmed in the FPGA 530 and transfer the test signals to the CPU 2131, enabling monitoring the state of the DC/DC pol 250 and power sequence control.

The first ADC 540 of the IPMC 500 is connected to a connector 410 to receive driving voltages, e.g., +3.3V AUX and +5V, and driving currents applied to the module directly or via a load 355, which may drop voltage, and to convert the driving voltages and currents into digital signals, so that the input voltage and current consumed by each module may be measured.

The second ADC 550 may receive voltages, e.g., 'V_CORE,' 'V_DDR,' and 'V_IO,' applied to the CPU 2131 and convert the voltages into digital signals, allowing the voltage of the DC/DC pol 250 to be measured. In other words, the second ADC 550 enables a checkup and monitoring of any abnormality in the voltage generated inside the module.

The second ADC 550 may be connected with a temperature sensor 260 included in the module and convert a temperature signal inputted from the temperature sensor 260 into a digital signal, allowing the temperature of the module to be measured so that it can be possible to determine whether the module is overheated.

The ethernet unit 560 may be connected with the connector 410 via a 10/100 M ethernet PHY 353 and a transformer 354 that may be connected together via a media independent interface (MII). The ethernet unit 560 may provide an interface with an external checking device.

As described above, in the LAD including health monitoring devices, the modules of each display computer may be connected with each other via the switch module. The LAD may measure driving voltages and currents input to the modules, the voltage of the point of load (PoL) produced inside the module, the temperature of each module, receive test results, and produce and provide measurement information by using various data items gathered.

According to various embodiments of the present invention, an LAD with multiple display modules includes health monitoring devices with the functionality of intelligent platform management controller (IPMC), which are capable of producing measurement information about, e.g., voltage input to the display computer of the LAD, and thus, the LAD may remain stable in operation and quickly respond to any problems or issues that may arise.

While the disclosure has been shown and described with reference to exemplary embodiments thereof, it will be apparent to those of ordinary skill in the art that various changes in form and detail may be made thereto without departing from the spirit and scope of the disclosure as defined by the following claims. Accordingly, the scope of the disclosure should be defined by the following claims and equivalents thereof, but not by the above-described embodiments.

What is claimed is:

1. A health monitoring device included in a large area display (LAD) with at least one display computers, the health monitoring device comprising:
   a universal asynchronous receiver-transmitter (UART) configured to produce a test path by communicating with a processor of the at least one display computer;
   a field programmable gate array (FPGA) configured to transmit a test signal to a terminal of the at least one display computer and receive a test result;
   an ethernet unit configured to communicate with a test terminal connected with the LAD to transmit a monitoring signal to the test terminal; and a micro-controller configured to gather an operation state of the at least one display computer and produce a measurement signal according to the test result.

2. The health monitoring device of claim 1, further comprising:
- a first analog-to-digital converter (ADC) configured to convert an input voltage and current applied to the processor into a first digital signal; and
- a second ADC configured to convert the test signal applied through the terminal to the processor into a second digital signal, wherein the micro-controller is configured to receive the first digital signal and the second digital signal and reflect the first digital signal and the second digital signal to the measurement signal.

3. The health monitoring device of claim 2, wherein the second ADC is configured to convert a temperature signal applied from a temperature sensor included in the at least one display computer into a third digital signal, and wherein the micro-controller is configured to receive the third digital signal and reflect the third digital signal to the measurement signal.

\* \* \* \* \*